(12) United States Patent
Hatayama

(10) Patent No.: US 11,010,329 B2
(45) Date of Patent: May 18, 2021

(54) ELECTRONIC DEVICE, MEASUREMENT MODE SETTING METHOD, AND RECORDING MEDIUM

(71) Applicant: CASIO COMPUTER CO., LTD., Tokyo (JP)

(72) Inventor: Takashi Hatayama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 332 days.

(21) Appl. No.: 16/120,729

(22) Filed: Sep. 4, 2018

(65) Prior Publication Data
US 2019/0095381 A1    Mar. 28, 2019

(30) Foreign Application Priority Data

Sep. 26, 2017    (JP) .............................. JP2017-184297

(51) Int. Cl.
| | | |
|---|---|---|
| G06F 15/02 | (2006.01) | |
| G01D 21/00 | (2006.01) | |
| G09B 19/02 | (2006.01) | |
| G06F 16/951 | (2019.01) | |
| G06F 11/30 | (2006.01) | |

(Continued)

(52) U.S. Cl.
CPC ......... *G06F 15/0275* (2013.01); *G01D 21/00* (2013.01); *G06F 11/3058* (2013.01); *G06F 11/3089* (2013.01); *G06F 16/951* (2019.01); *G09B 19/025* (2013.01); *G01D 9/005* (2013.01); *G06F 3/04847* (2013.01); *G06F 16/22* (2019.01)

(58) Field of Classification Search
CPC ............. G06F 11/3058; G06F 11/3089; G06F 15/0275; G06F 16/22; G06F 16/951; G06F 3/04847; G09B 19/025
See application file for complete search history.

(56) References Cited

U.S. PATENT DOCUMENTS

| | | |
|---|---|---|
| 5,526,287 A | 6/1996 | French |
| 10,198,555 B2 | 2/2019 | Thompson et al. |

(Continued)

FOREIGN PATENT DOCUMENTS

| | | |
|---|---|---|
| EP | 3419004 A1 | 12/2018 |
| GB | 2125996 A | 3/1984 |

(Continued)

OTHER PUBLICATIONS

Extended European Search Report (EESR) dated Feb. 22, 2019 issued in counterpart European Application No. 18193749.1.

*Primary Examiner* — Elias Desta
(74) *Attorney, Agent, or Firm* — Holtz, Holtz & Volek PC

(57) ABSTRACT

An electronic device includes a communication device and a processor. The processor receives sensor kind information via the communication device from one of at least one sensor or an electronic measurement instrument to which the at least one sensor is connected, transmits the received sensor kind information to a database storing a combination of a sensor kind and a measurement mode in which measurement contents are defined, acquires, from the database, the measurement mode in accordance with the transmitted sensor kind information, and sets the acquired measurement mode corresponding to one of the at least one sensor or the at least one sensor connected to the electronic measurement instrument.

9 Claims, 5 Drawing Sheets

(51) Int. Cl.
*G01D 9/00* (2006.01)
*G06F 16/22* (2019.01)
*G06F 3/0484* (2013.01)

(56) References Cited

U.S. PATENT DOCUMENTS

| | | | |
|---|---|---|---|
| 2004/0069046 A1* | 4/2004 | Sunshine | G01N 33/0031 |
| | | | 73/23.34 |
| 2008/0109259 A1 | 5/2008 | Thompson et al. | |
| 2011/0201382 A1* | 8/2011 | Hsiao | A61B 5/0022 |
| | | | 455/556.1 |
| 2016/0345832 A1* | 12/2016 | Pavagada Nagaraja | |
| | | | A61B 5/746 |
| 2018/0164973 A1* | 6/2018 | Kim | G06F 3/04817 |
| 2018/0374248 A1 | 12/2018 | Okuma | |

FOREIGN PATENT DOCUMENTS

| | | |
|---|---|---|
| JP | 2003281671 A | 10/2003 |
| JP | 2004094870 A | 3/2004 |
| JP | 2004102828 A | 4/2004 |
| JP | 2004354725 A | 12/2004 |
| JP | 2015206714 A | 11/2015 |
| WO | 9601411 A1 | 1/1996 |

* cited by examiner

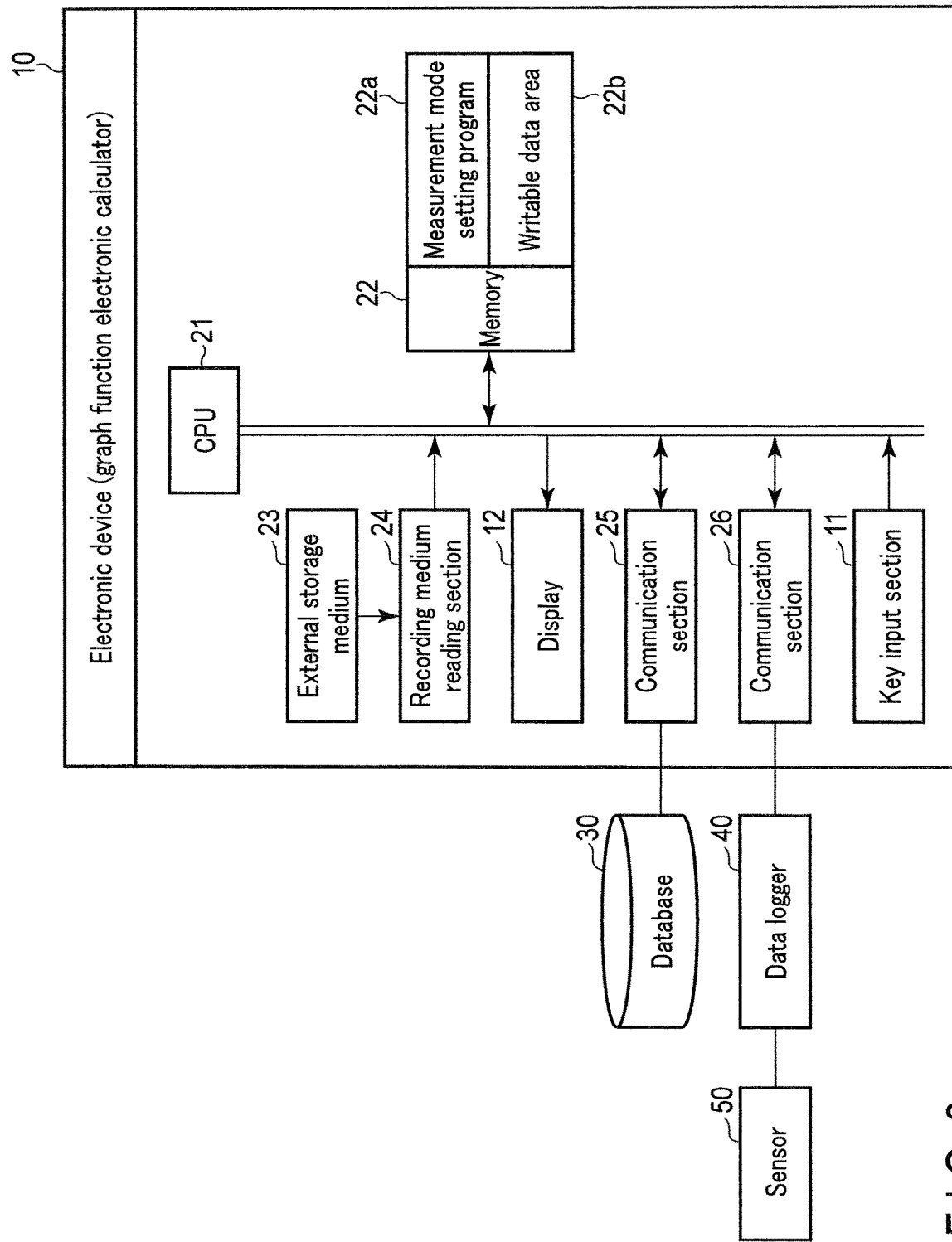
F I G. 2

| Identification number (return value) | Sensor kind | Measurement mode |
|---|---|---|
| 1 | Temperature sensor | Time-based (long-period) sampling mode |
| 2 | Voltage sensor | Manual sampling mode |
| 3 | Sound sensor | Time-based (short-period) sampling mode |
| 4 | Photo-gate sensor | Count mode |
| ... | ... | ... |

ELECTRONIC DEVICE, MEASUREMENT MODE SETTING METHOD, AND RECORDING MEDIUM

CROSS-REFERENCE TO RELATED APPLICATION

This application is based upon and claims the benefit of priority from Japanese Patent Applications No. 2017-184297, filed Sep. 26, 2017, the entire contents of all of which are incorporated herein by reference.

BACKGROUND OF THE INVENTION

1. Field of the Invention

The technical field relates to an electronic device such as a graph function electronic calculator capable of acquiring a detection signal from a sensor, a method of automatically setting a measurement mode of a sensor in the electronic device, and a computer-readable recording medium.

2. Description of the Related Art

A graph function electronic calculator is an electronic calculator capable of drawing a graph, calculating simultaneous equations, and performing a computation using a variable. The graph function electronic calculator of this kind has a display, and is also capable of displaying multiple lines of text or a graph of a calculation result on the display.

As above, the graph function electronic calculator comprises a computation function and a display function. Moreover, in recent years, a graph function electronic calculator comprising a function of connecting to a sensor has also been manufactured. When connected to a sensor, the graph function electronic calculator of this kind also acquires a detection signal from the sensor, performs a predetermined computation on the detection signal, and displays the result as a graph. (E.g., see Jpn. Pat. Appln. KOKAI Publication No. 2003-281671 (PATENT LITERATURE 1).)

Furthermore, in recent years, to simplify processing required for the above, a measurement application which automates setting processing at the time of connecting a sensor to a graph function electronic calculator has also been developed.

According to this measurement application, a kind of sensor is automatically recognized by the measurement application if a data logger connected to the sensor is connected to a graph function electronic calculator.

It is considered that a graph function electronic calculator equipped with such a measurement application is used in a field of education such as a science experiment.

Incidentally, various measurements are performed in science experiments. These are classified into several measurement modes in accordance with characteristics of measurements. For example, a temperature measurement over the elapse of time is classified into (1) a "measurement mode to observe the fluctuation of measurement values over the elapse of time", and a pH measurement over the titer of a solution is classified into (2) a "measurement mode to observe the fluctuation of measurement values over the change of a certain condition". In addition, when experiments using other sensors and multiple sensors are also considered, there are more measurement modes.

There are a large number of measurement modes as described above. Therefore, when a measurement experiment is conducted by use of a graph function electronic calculator equipped with a measurement application, it is necessary to set a measurement mode in the graph function electronic calculator before the experiment.

BRIEF SUMMARY OF THE INVENTION

An electronic device comprises a communication device and a processor. The processor receives sensor kind information via the communication device from one of at least one sensor or an electronic measurement instrument to which the at least one sensor is connected, transmits the received sensor kind information to a database storing a combination of a sensor kind and a measurement mode in which measurement contents are defined, acquires, from the database, the measurement mode in accordance with the transmitted sensor kind information, and sets the acquired measurement mode corresponding to one of the at least one sensor or the at least one sensor connected to the electronic measurement instrument.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

The components in the drawings are not necessarily to scale relative to each other.

FIG. 2 is a block diagram showing a configuration of an electronic circuit of the electronic device;

DETAILED DESCRIPTION OF THE PREFERRED EMBODIMENTS

Hereinafter, an electronic device to which a measurement mode setting method according to an embodiment of the present invention is applied will be described with reference to the drawings.

Figure 1:
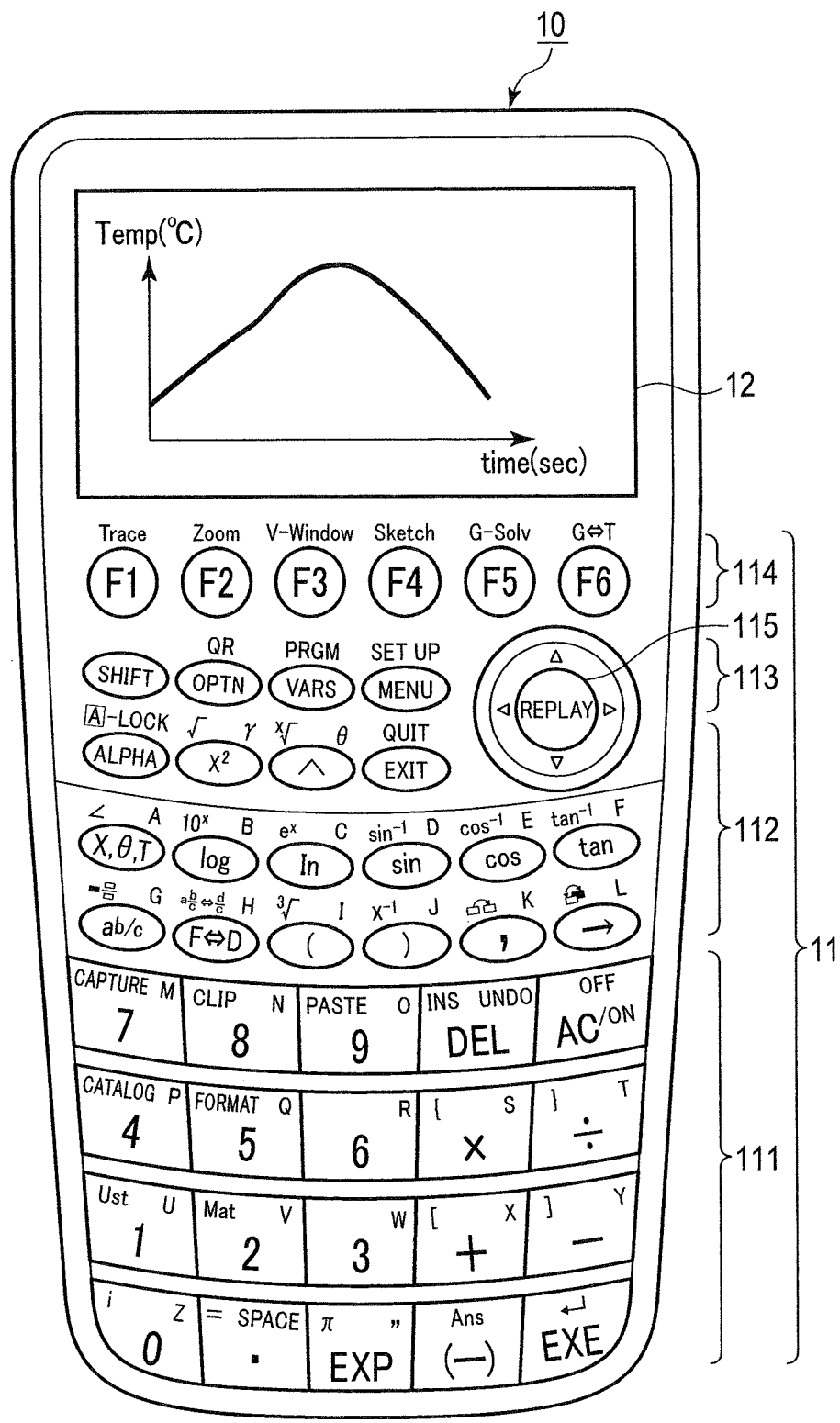
FIG. 1 is a front view showing an appearance configuration of an electronic device to which a measurement mode setting method according to an embodiment of the present invention is applied.

FIG. 1 is a front view showing an appearance configuration of an electronic device 10 to which the measurement mode setting method according to the embodiment of the present invention is applied, and is a diagram showing the case where the electronic device 10 is implemented as a graph function electronic calculator.

A graph function electronic calculator is described below as the electronic device 10 by way of example. However, the electronic device 10 is not exclusively configured as a graph function electronic calculator, and can also be configured as a tablet terminal, a personal computer, a smartphone, a mobile telephone, a touch panel type personal digital assistant (PDA), an electronic book, a portable gate device, or the like.

Note that an electronic device (not shown) such as a tablet terminal in which no physical keys (buttons) as in a graph function electronic calculator are mounted displays a software keyboard like keys of a graph function electronic calculator, and executes processing in accordance with a key operation on this software keyboard.

The electronic device 10 configured as a graph function electronic calculator has, for the necessity of its portability, a small size that allows a user to grasp well with one hand and operate with one hand, and is provided with a key input section 11 and a display 12 in the front surface of a main body.

The key input section 11 comprises a numerical/computation symbol key group 111 to input numerical values, numerical expressions, and program instructions and to instruct to execute calculations and programs, a function faculty key group 112 to input various functions and start a memory function, a mode setting key group 113 to display a menu screen for various operation modes such as a calculation mode and an algorithm mode and to instruct to set these operation modes, a function key group 114 to start various functions displayed along the lower edge of the display 12 by one key operation, and cursor keys 115 to perform an operation of moving a cursor displayed on the display 12 and an operation of selecting a data item.

[0] to [9] (numerical) keys, [+], [−], [×], and [÷] (four-operation symbol) keys, an [EXE] (execution) key, an [AC] (clear) key, and the like are arranged as the numerical/computation symbol key group 111.

A [sin] (sine) key, a [cos] (cosine) key, a [tan] (tangent) key, and the like are arranged as the function faculty key group 112.

A [MENU] (menu) key, a [SHIFT] (shift) key, an [OPTN] (option) key, and the like are arranged as the mode setting key group 113.

[F1] to [F6] keys are arranged as the function key group 114.

It should be noted that when operated following the operation of the [SHIFT] key, each of the keys of the numerical/computation symbol key group 111, the function faculty key group 112, the mode setting key group 113, and the function key group 114 does not perform a key function indicated on its key top, but can function as a key indicated in the upper part of the key. For example, if the [AC] key is operated after the operation of the [SHIFT] key (hereinafter, referred to as [SHIFT]+[AC] keys.), the [AC] key serves as an [OFF] (power off) key. [SHIFT]+[NENU] keys serve as a [SET UP] (set up) key, and [SHIFT]+[F3] keys serve as a [V-Window] (view window: instructing to display a drawing region setting screen) key.

The display 12 comprises a dot matrix type liquid crystal display unit. It should be noted that when the electronic device 10 is a tablet terminal, the display 12 comprises a liquid crystal display unit over which a touch panel is provided. The display 12 displays, as a graph, the result of a computation performed by a measurement mode setting program (a later-described measurement mode setting program 22a shown in FIG. 2) for a detection signal by a sensor (a later-described sensor 50 shown in FIG. 2).

FIG. 2 is a block diagram showing a configuration of an electronic circuit of the electronic device 10.

The electronic circuit of the electronic device 10 comprises a CPU 21 which is a computer, a memory 22, a recording medium reading section 24, a communication section (a first communication section provided in a communication device) 25, and a communication section 26 (a second communication section provided in the communication device), in addition to the key input section 11 and the display 12.

The CPU 21 controls the operation of each part of the circuit in accordance with the measurement mode setting program 22a stored in the memory 22, and executes various kinds of computation processing corresponding to key input signals from the key input section 11. The measurement mode setting program 22a may be stored in the memory 22 in advance, or may be read and then stored in the memory 22 from an external recording medium 23 such as a memory card via the recording medium reading section 24. The measurement mode setting program 22a is configured to keep the user from rewriting by the operation of the key input section 11.

A writable data area 22b is secured in the memory 22 as an area to store data rewritable by the user in addition to the above information unrewritable by the user. Data of key codes input by the key input section 11 are sequentially input to the writable data area 22b, and data of numerical expressions, table data, graph data, and the like configured accordingly are stored in the writable data area 22b.

A database 30 is connected to the communication section 25.

Figures 3, 4:
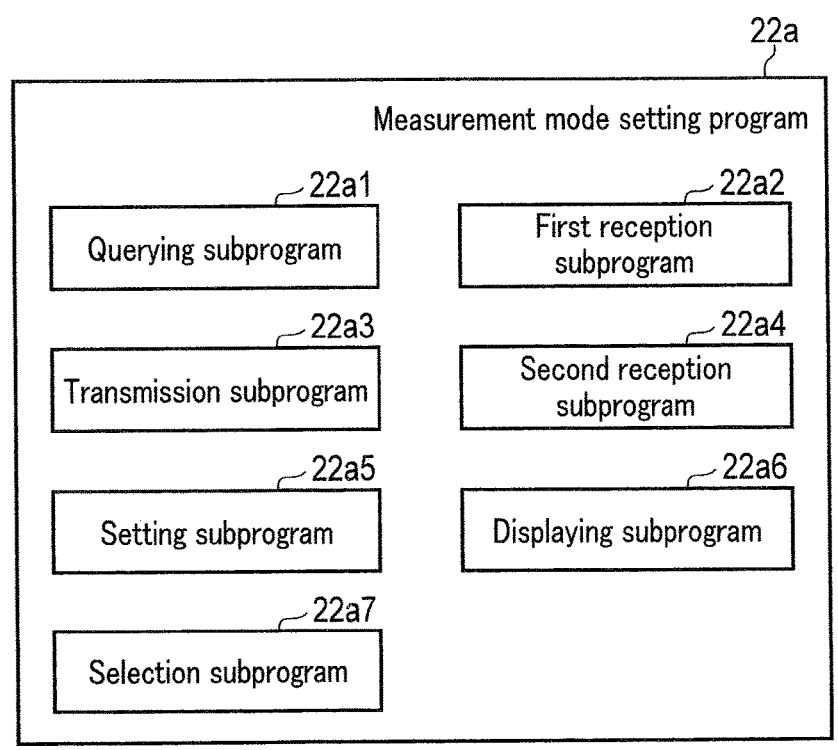
FIG. 3 is a data configuration diagram showing a configuration example of a database.
FIG. 4 is a diagram showing subprograms included in a measurement mode setting program.

FIG. 3 is a data configuration diagram showing a configuration example of the database 30.

The database 30 stores records R1, R2, and ... comprising a combination B including an identification number B1, a sensor kind B2, and a measurement mode B3 in which the contents of measurement by the sensor are defined.

As shown in FIG. 3, examples of the sensor kind B2 are a temperature sensor, a voltage sensor, a sound sensor, a photo-gate sensor, and the like. Moreover, corresponding examples of the measurement mode B3 are a time-based (long-period) sampling mode (in which time is recorded on a horizontal axis and measurement values are recorded on a vertical axis) as in a temperature measurement, a manual sampling mode (in which a user acquires a measurement value at any timing, and suitably inputs and records a value on a horizontal axis corresponding to the measurement value) as in a voltage measurement, a time-based (short-period) sampling mode (in which time is recorded on a horizontal axis and measurement values are recorded on a vertical axis) as in a sound measurement, and a count mode (in which time and the number of times after or before on a threshold is crossed are recorded) as in photo counting. However, the sensor kind B2 and the measurement mode B3 are not limited to these examples. The combination B is not limited to the example shown in FIG. 3, either.

The communication section 25 communicates with the database 30 in a wired or wireless manner, acquires data necessary for measurement mode setting from the database 30 in accordance with an instruction from the measurement mode setting program 22a, and outputs the data to the measurement mode setting program 22a.

It should be noted that the database 30 is provided outside the electronic device 10 in the illustration of FIG. 2, but may be incorporated in the electronic device 10. When the database 30 is incorporated in the electronic device 10, the contents of the database 30 may be updatable by, for example, adding a new record R to the database 30, or changing the contents of the record R, through communication from a device outside the electronic device 10. In this case, the electronic device 10 has only to be provided with, for example, a communication section (a third communication section provided in the electronic device) which is different from the communication sections 25 and 26 and which serves to communicate with the external device.

The communication section 26 communicates with a data logger (electronic measurement instrument) 40 in a wired or wireless manner. One or more sensors 50 are connected to the data logger 40. Examples of the sensor 50 include, a temperature sensor, a voltage sensor, a sound sensor, a photo-gate sensor, and the like, as has been described above with reference to FIG. 3. It should be noted that in a scene where multiple students simultaneously perform measurements using the sensor 50, connection between the communication section 26 and the data logger 40 is preferably wired connection. When the communication section 26 and the data logger 40 are connected to each other in a wired manner, it is possible to prevent, for example, an improper act by a student to improperly acquire experiment data of another student in a situation where each student has to acquire experiment data by measurement using the sensor 50.

One or more sensors 50 can be connected to the data logger 40. When the sensors 50 are connected to the data logger 40, the data logger 40 recognizes the kind of each of the connected sensors 50, and transmits, to the communication section 26, each piece of recognition result information (which is, herein, information regarding the kind of sensor recognized by the data logger 40, and hereinafter also referred to as "sensor kind information"). Moreover, the data logger 40 has a recording function of acquiring a detection result by each sensor 50 from each sensor 50, and recording each detection result. It should be noted that if the electronic device 10 has a function of acquiring a detection result from the sensor 50, and storing the detection result in the writable data area 22b of the memory 22, the data logger 40 may be omitted, and the memory 22 may be used instead of the data logger 40.

The communication section 26 acquires the detection result information from the data logger 40 in accordance with an instruction from the measurement mode setting program 22a. The communication section 26 also acquires the detection result by the sensor 50 recorded in the data logger 40 in accordance with an instruction from the measurement mode setting program 22a, and outputs the detection result to the measurement mode setting program 22a.

It should be noted that the data logger 40 is provided outside the electronic device 10 in the illustration of FIG. 2, but may be incorporated in the electronic device 10.

The electronic device 10 configured as above enables a measurement mode setting function as will be described later when the CPU 21 controls the operation of each part of the circuit in accordance with an instruction described in the measurement mode setting program 22a, and software and hardware operate in cooperation with each other.

The measurement mode setting program 22a is a program with which the electronic device 10 automatically sets the measurement mode B3 (execution/measurement mode) to acquire a detection signal from the sensor 50.

FIG. 4 is a configuration diagram showing subprograms 22a1 to 22a7 included in the measurement mode setting program 22a.

As shown in FIG. 4, the measurement mode setting program 22a comprises a querying subprogram 22a1, a first reception subprogram 22a2, a transmission subprogram 22a3, a second reception subprogram 22a4, a setting subprogram 22a5, a displaying subprogram 22a6, and a selection subprogram 22a7.

Figure 5:
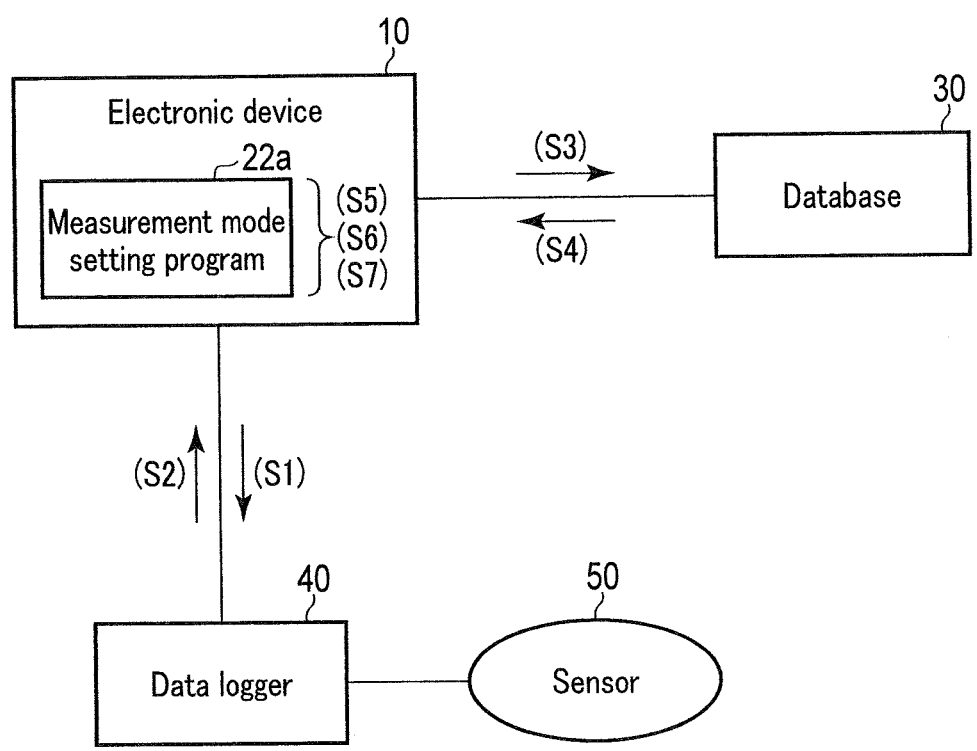
FIG. 5 is a diagram showing the flow of processing by the measurement mode setting program.

FIG. 5 is a diagram showing the flow of processing by the measurement mode setting program 22a.

It should be noted that the electronic device 10, the database 30, and the data logger 40 are independent from one another in the illustration of FIG. 5, but at least one of the database 30 and the data logger 40 may be incorporated in the electronic device 10.

The querying subprogram 22a1 queries the data logger 40 to which the sensor 50 is connected about the kind of sensor via the communication section 26 (S1). In response to this query, the data logger 40 outputs, to the communication section 26, sensor kind information of the connected sensor 50 (S2). The communication section 26 outputs this sensor kind information to the measurement mode setting program 22a.

In the measurement mode setting program 22a, the first reception subprogram 22a2 receives the sensor kind information, and outputs the sensor kind information to the transmission subprogram 22a3.

The transmission subprogram 22a3 transmits this sensor kind information to the database 30 via the communication section 25 (S3). The database 30 searches for the measurement mode B3 corresponding to the sensor kind B2 corresponding to the sensor kind information on the basis of the combination B shown by way of example in FIG. 3, and outputs the measurement mode B3 to the communication section 25 (S4).

The communication section 25 outputs the measurement mode B3 output from the database 30, to the measurement mode setting program 22a.

In the measurement mode setting program 22a, the second reception subprogram 22a4 receives the measurement mode B3, and outputs the measurement mode B3 to the setting subprogram 22a5 and the displaying subprogram 22a6.

If this measurement mode B3 corresponds to the execution/measurement mode (already set execution/measurement mode) currently set for the electronic device 10 (S5: Yes), the setting subprogram 22a5 sets the sensor 50 corresponding to the sensor kind information for the electronic device 10 (S6). On the other hand, if the measurement mode B3 does not correspond (S5: No), the setting subprogram 22a5 switches the execution/measurement mode currently set for the electronic device 10 to the measurement mode B3, and sets the sensor 50 corresponding to the sensor kind information for the electronic device 10 (S7). More specifically, a region to hold the current execution/measurement mode is provided in the writable data area 22b of the memory 22. An execution/measurement mode held in this writable data area 22b is used as the above-described execution/measurement mode currently set for the electronic device 10. If the execution/measurement mode held in the writable data area 22b corresponds to the measurement mode B3 received from the database 30, the CPU 21 keeps on holding the execution/measurement mode held in the writable data area 22b. In this instance, the CPU 21 may write the measurement mode B3 received from the database 30 over the execution/measurement mode held in the writable data area 22*b*, or may keep holding the execution/measurement mode already held in the writable data area 22*b* as it is without writing the measurement mode B3 received from the database 30 over the execution/measurement mode held in the writable data area 22*b*. On the other hand, if the execution/measurement mode held in the writable data area 22*b* does not correspond to the measurement mode B3 received from the database 30, the CPU 21 switches the current execution/measurement mode to the measurement mode B3 by rewriting the execution/measurement mode held in the writable data area 22*b* to the measurement mode B3 received from the database 30.

The displaying subprogram 22*a*6 displays the measurement mode B3 received by the second reception subprogram 22*a*4 and the sensor kind information on the display 12. It should be noted that when multiple sensors 50 are connected to the data logger 40, multiple pieces of sensor kind information are output from the data logger 40, and multiple corresponding measurement modes B3 are output from the database 30 accordingly. In this case, the displaying subprogram 22*a*6 displays, on the display 12, multiple combinations comprising all pieces of sensor kind information and the respective measurement modes B3 available for measurement.

When multiple combinations are displayed on the display 12, the selection subprogram 22*a*7 accepts, from the user, a selection input to specify which combination to select among the displayed combinations. If the user performs selection input by operating the key input section 11 in accordance with the display, the selection subprogram 22*a*7 accepts this selection input, and outputs the selection input to the setting subprogram 22*a*5.

If the measurement mode B3 specified by the selection input corresponds to the execution/measurement mode currently set for the electronic device 10 (S5: Yes), the setting subprogram 22*a*5 sets the sensor 50 corresponding to the sensor kind information corresponding to the measurement mode B3 for the electronic device 10 (S6). On the other hand, if the measurement mode B3 does not correspond (S5: No), the setting subprogram 22*a*5 switches the execution/measurement mode currently set for the electronic device 10 to the measurement mode B3 specified by the selection input, and sets the sensor 50 corresponding to the sensor kind information corresponding to the measurement mode B3 for the electronic device 10 (S7). More specifically, a region to set the sensor 50 corresponding to the sensor kind information corresponding to the measurement mode B3 is set in the writable data area 22*b* of the memory 22. By holding information regarding the sensor 50 corresponding to the sensor kind information corresponding to the measurement mode B3 described above in the writable data area 22*b*, the CPU 21 sets the sensor 50 corresponding to the sensor kind information corresponding to the measurement mode B3 described above. It should be noted that in the present embodiment, a currently set execution/measurement mode means, for example, an execution/measurement mode or the like set at the previous measurement. In addition, at the first measurement, if a predetermined execution/measurement mode is set in initial setting, this predetermined execution/measurement mode is used as the currently set execution/measurement mode.

Next, the operation of the electronic device 10 to which the measurement mode setting method according to the embodiment of the present invention configured as described above is applied is described with reference to a flowchart shown in FIG. 6.

In the case described by way of example herein, a temperature measurement is performed in a time-based (long-period) sampling mode by use of a temperature sensor.

Thus, when a temperature measurement is performed, a temperature sensor is connected to the data logger 40 as the sensor 50. Then, the data logger 40 recognizes a sensor kind as a temperature sensor.

On the other hand, as shown in FIG. 3, the records R1, R2, and . . . comprising the combination B including the identification number B1, the sensor kind B2, and the measurement mode B3 in which the contents of measurement by the sensor are defined are stored in the database 30.

If the data logger 40 is connected to the communication section 26 of the electronic device 10 in a wired or wireless manner, the querying subprogram 22*a*1 queries the data logger 40 about the kind of sensor via the communication section 26 (S1). In response to this query, the data logger 40 outputs, to the communication section 26, sensor kind information (temperature sensor) of the connected sensor 50 (S2). That is, the electronic device 10 inputs the sensor kind information (temperature sensor) by the communication section 26. In the communication section 26, this sensor kind information (temperature sensor) is output to the measurement mode setting program 22*a*.

In the measurement mode setting program 22*a*, the sensor kind information (temperature sensor) is received by the first reception subprogram 22*a*2, and output to the transmission subprogram 22*a*3.

In the transmission subprogram 22*a*3, the sensor kind information (temperature sensor) is transmitted to the database 30 via the communication section 25 (S3). In the database 30, the measurement mode B3 (time-based (long-period) sampling mode) corresponding to the sensor kind B2 (temperature sensor) corresponding to the sensor kind information (temperature sensor) is searched for on the basis of the combination B shown by way of example in FIG. 3, and output to the communication section 25 (S4). That is, the electronic device 10 inputs the measurement mode B3 (time-based (long-period) sampling mode) by the communication section 25.

In the communication section 25, the measurement mode B3 (time-based (long-period) sampling mode) output from the database 30 is output to the measurement mode setting program 22*a*.

In the measurement mode setting program 22*a*, the measurement mode B3 (time-based (long-period) sampling mode) is received by the second reception subprogram 22*a*4, and output to the setting subprogram 22*a*5 and the displaying subprogram 22*a*6.

In the setting subprogram 22*a*5, if this measurement mode B3 (time-based (long-period) sampling mode) corresponds to the execution/measurement mode currently set for the electronic device 10 (S5: Yes), the sensor 50 corresponding to the sensor kind information (temperature sensor) is set for the electronic device 10 (S6). On the other hand, if the measurement mode B3 does not correspond (S5: No), the execution/measurement mode currently set for the electronic device 10 is switched to the measurement mode B3 (time-based (long-period) sampling mode), and the sensor 50 corresponding to the sensor kind information (temperature sensor) is set for the electronic device 10 (S7).

In the displaying subprogram 22*a*6, the measurement mode B3 (time-based (long-period) sampling mode) and the sensor kind information (temperature sensor) received by the second reception subprogram 22*a*4 are displayed on the display 12. It should be noted that when multiple sensors 50 are connected to the data logger 40, multiple pieces of sensor kind information are output from the data logger 40, and multiple corresponding measurement modes B3 are output from the database 30 accordingly.

For example, two sensors α and β are connected to the data logger 40, and measurement modes (e.g., a measurement mode x for the sensor α, a measurement mode y for the sensor β, and a measurement mode z when both the sensors α and β are used) for each of the sensors α and β are stored in the database 30. In this case, as shown by way of example in FIG. 7, multiple combinations (e.g., records r1, r2, and r3) comprising all pieces of sensor kind information (the sensor α alone, the sensor β alone, both the sensors α and β) and the respective measurement modes B3 (the measurement mode x, the measurement mode y, and the measurement mode z) available for measurement are displayed on the display 12 by the displaying subprogram 22a6.

Figures 6, 7:
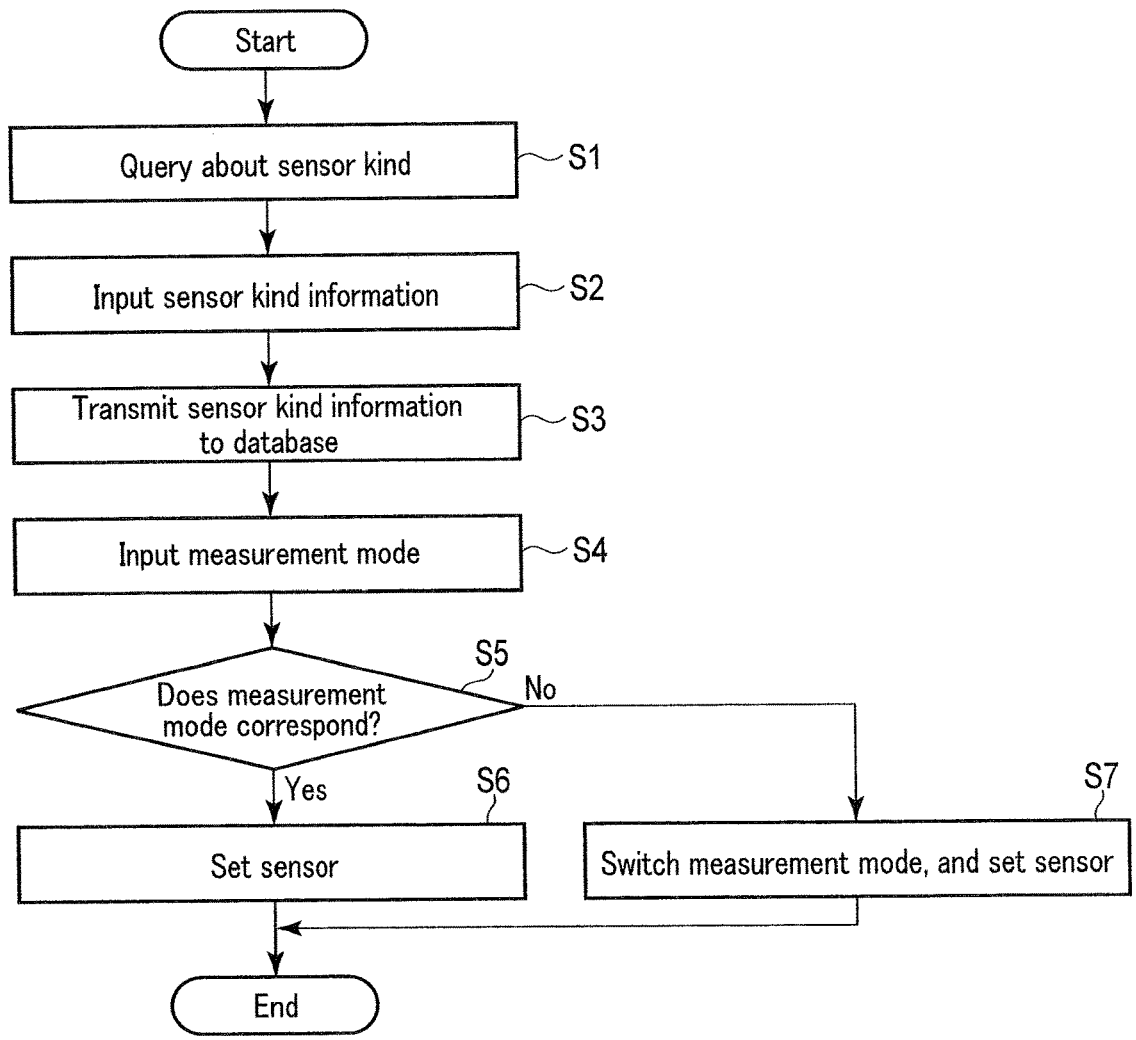
FIG. 6 is a flowchart showing an operation example of the electronic device to which the measurement mode setting method according to the embodiment of the present invention is applied.
FIG. 7 is a conceptual diagram showing a display example in the case where multiple combinations are displayed on a display.

Thus, when multiple sensors 50 are connected to the data logger 40, and multiple combinations are displayed on the display 12 as shown in FIG. 7, the user can perform a selection input (e.g., the record r3) to specify which combination to select, by operating the key input section 11.

This selection input is received by the selection subprogram 22a7, and output to the setting subprogram 22a5. In the setting subprogram 22a5, if the measurement mode B3 (e.g., the measurement mode z included in the record r3) included in the combination specified by the selection input corresponds to the execution/measurement mode currently set for the electronic device 10 (S5: Yes), the sensors α and β which are sensors of the sensor kind B2 corresponding to the measurement mode B3 (measurement mode z) are set for the electronic device 10 (S6). On the other hand, if the measurement mode B3 does not correspond (S5: No), the execution/measurement mode currently set for the electronic device 10 is switched to the measurement mode B3 (measurement mode z) specified by the selection input, and the sensors 50 (sensors α and β) corresponding to the sensor kind B2 corresponding to the measurement mode B3 (measurement mode z) are set for the electronic device 10 (S7).

As described above, the electronic device 10 to which the display method according to the embodiment of the present invention is applied can automatically set a measurement mode of the sensor 50 (execution/measurement mode corresponding to the sensor 50 connected to the data logger 40) by the action as described above. Therefore, it is possible to save time and labor conventionally required for setting work of a measurement mode.

Consequently, a teacher does not need to manually set an execution/measurement mode in graph function electronic calculators of students, and it is thus possible to reduce a work load of the teacher.

Moreover, students do not need to manually set an execution/measurement mode in their graph function electronic calculators. Thus, a class period can be efficiently utilized for experiments. Even when multiple kinds of experiments are conducted in one class, a class period can be efficiently utilized for measurement work because setting necessary for every change of sensor to be used is automatically performed.

Furthermore, even when a complicated experiment using multiple sensors is conducted, measurement work can be correctly carried out because a suitable measurement mode is automatically set with certainty.

Thus, according to the invention of the present application, both a teacher and a student have an advantage, and it is possible to improve the efficiency and certainty of measurement work.

In the above-described embodiment, the example in which the sensor 50 is connected to the electronic device 10 via the data logger 40 has been described, but the invention is not limited thereto. The invention may have a configuration in which the data logger 40 is omitted under the above-described conditions and the sensor 50 is directly connected to the electronic device 10, and the same operation and effect as those in the above embodiment are exerted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention of the present application is not limited to each embodiment, and, at the stage of implementation, can be variously modified without departing from the spirit thereof. Further, inventions at various stages are included in each embodiment, and various inventions can be extracted by a suitable combination of disclosed constitutional requirements. For example, when the problems described in the section BACKGROUND OF THE INVENTION can be solved and the advantageous effects described in the section BRIEF SUMMARY OF THE INVENTION can be obtained even if some of all the constitutional requirements shown in each embodiment are eliminated, or several constitutional requirements are combined in a different form, a configuration in which those constitutional requirements are eliminated or combined can be extracted as an invention.

What is claimed is:

1. An electronic device comprising:
   a communication device;
   a display;
   a key input section; and
   a processor;
   wherein the processor:
      receives sensor kind information via the communication device from one of (i) at least one sensor and (ii) an electronic measurement instrument to which the at least one sensor is connected,
      transmits the received sensor kind information to a database storing a combination of a sensor kind and a measurement mode in which measurement contents are defined,
      acquires, from the database, the measurement mode corresponding to the transmitted sensor kind information,
      sets, as an execution/measurement mode, the measurement mode acquired from the database, and
      displays, on the display, a combination comprising the measurement mode acquired from the database, and
   wherein, when multiple sensors are connected, the processor:
      displays multiple combinations on the display in accordance with the multiple sensors;
      accepts a selection input, that is an input performed by a user by operating the key input section, to specify which combination to select from among the displayed multiple combinations, and
      switches a currently set execution/measurement mode to the measurement mode specified by the accepted selection input, and sets the sensor corresponding to a sensor kind corresponding to the specified measurement mode when the measurement mode included in the combination specified by the accepted selection input does not correspond to the currently set execution/measurement mode.

2. The electronic device according to claim 1, wherein the processor:
   queries the electronic measurement instrument via the communication device about a sensor kind regarding the at least one sensor connected to the electronic measurement instrument, and
   receives, via the communication device, the sensor kind information returned from the electronic measurement instrument in response to the query.

3. The electronic device according to claim 1, further comprising a memory to hold the currently set execution/measurement mode,
   wherein the processor switches the currently set execution/measurement mode by rewriting the currently set execution/measurement mode held in the memory to the measurement mode specified by the accepted selection input when the currently set execution/measurement mode does not correspond to the measurement mode specified by the accepted selection input.

4. The electronic device according to claim 1, wherein at least one of the electronic measurement instrument and the database is incorporated in the electronic device.

5. The electronic device according to claim 4, wherein the contents of the database are updated by external communication when the database is incorporated in the electronic device.

6. The electronic device according to claim 1, wherein the communication device comprises:
   a first communication section to communicate with the database, and
   a second communication section to communicate with the electronic measurement instrument.

7. A measurement mode setting method executed by a processor of an electronic device, the measurement mode setting method comprising:
   receiving sensor kind information from one of (i) at least one sensor and (ii) an electronic measurement instrument to which the at least one sensor is connected,
   transmitting the received sensor kind information to a database storing a combination of a sensor kind and a measurement mode in which measurement contents are defined,
   acquiring, from the database, the measurement mode corresponding to the transmitted sensor kind information,
   setting, as an execution/measurement mode, the measurement mode acquired from the database, and
   displaying, on a display, a combination comprising the measurement mode acquired from the database,
   wherein, when multiple sensors are connected, the method further comprises:
      displaying multiple combinations on the display in accordance with the multiple sensors,
      accepting a selection input, that is an input performed by a user by operating a key input section, to specify which combination to select from among the displayed multiple combinations, and
      switching a currently set execution/measurement mode to the measurement mode specified by the accepted selection input, and setting the sensor corresponding to a sensor kind corresponding to the specified measurement mode when the measurement mode included in the combination specified by the accepted selection input does not correspond to the currently set execution/measurement mode.

8. The measurement mode setting method according to claim 7, further comprising:
   querying the electronic measurement instrument about a sensor kind regarding the at least one sensor connected to the electronic measurement instrument, and
   receives the sensor kind information returned from the electronic measurement instrument in response to the query.

9. A non-transitory computer-readable recording medium recording a program executable by a computer to control the computer to perform processes comprising:
   receiving sensor kind information from one of (i) at least one sensor and (ii) an electronic measurement instrument to which the at least one sensor is connected,
   transmitting the received sensor kind information to a database storing a combination of a sensor kind and a measurement mode in which measurement contents are defined,
   acquiring, from the database, the measurement mode corresponding to the transmitted sensor kind information,
   setting, as an execution/measurement mode, the measurement mode acquired from the database, and
   displaying, on a display, a combination comprising the measurement mode acquired from the database,
   wherein, when multiple sensors are connected, the processes further comprise:
      displaying multiple combinations on the display in accordance with the multiple sensors,
      accepting a selection input, that is an input performed by a user by operating a key input section, to specify which combination to select from among the displayed multiple combinations, and
      switching a currently set execution/measurement mode to the measurement mode specified by the accepted selection input, and setting the sensor corresponding to a sensor kind corresponding to the specified measurement mode when the measurement mode included in the combination specified by the accepted selection input does not correspond to the currently set execution/measurement mode.

* * * * *